Dec. 20, 1932.   N. D. PITTSON   1,891,575
CALF FEEDER
Filed Dec. 10, 1930

INVENTOR
Nikolais David Pittson
his Attorney

Patented Dec. 20, 1932

1,891,575

UNITED STATES PATENT OFFICE

NIKOLAIS DAVID PITTSON, OF HANNA, ALBERTA, CANADA

CALF FEEDER

Application filed December 10, 1930. Serial No. 501,357.

This present invention relates to certain new and useful improvements in a pail and holder.

The invention has for a primary object the provision of a pail and holder especially designed for feeding a baby calf, goat, lamb or other animal.

The invention has for another object the provision of a pail and holder of the character stated from which the baby animal will readily learn to drink and may be thus easily weaned from its mother.

The invention has for a further object the provision of a pail and holder of the character stated which may be readily mounted and firmly held in a convenient position for the baby animal.

The invention has for a still further object the provision of a pail and holder of the character stated which will assure automatic straining of the milk as it is withdrawn from the pail by the baby animal.

The invention has for a still further object the provision of a pail and holder of the character stated which includes a feeding nipple normally retained in position directly above the level of the milk in the pail and in such a position that it may be readily reached by the baby animal.

The invention has for a still further object of the provision of a pail and holder of the character stated which is not only highly efficient in use and composed of the minimum number of parts of simple and inexpensive construction but may be manufactured complete at small cost and retailed at a popular price with good profit, thus providing a commercially attractive proposition.

To the accomplishment of these and related objects as shall become apparent as the description proceeds, my invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure, wherein like characters indicate like parts throughout the several views.

In the drawing:—

Figure 1:
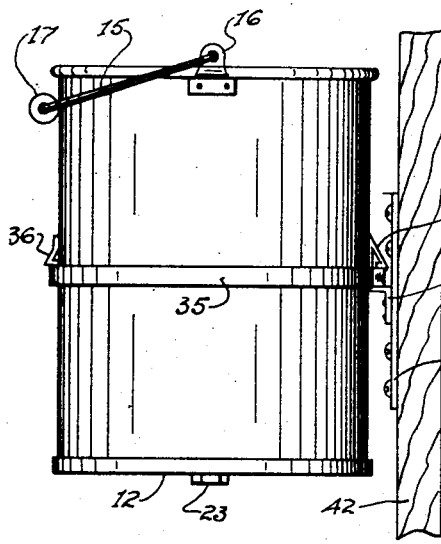
Figure 1 is a side elevation of the improved pail and holder, showing the same mounted on a stationary support.
Figure 2:
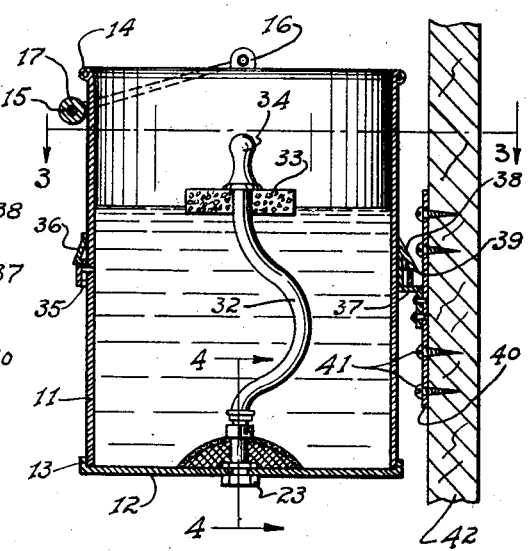
Figure 2 is a vertical section through the pail and holder as disclosed in Figure 1.
Figures 3, 4:
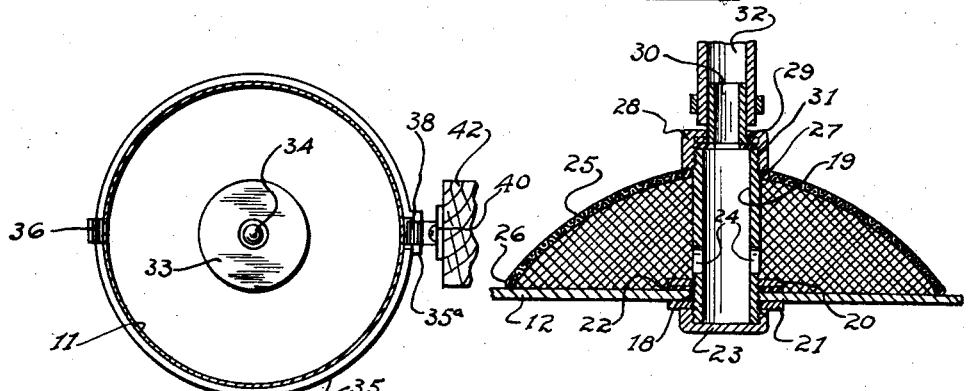
Figure 3 is a horizontal transverse section, taken substantially on the plane of line 3—3 of Figure 2, looking in the direction indicated by the arrows.
Figure 4 is an enlarged detail vertical section, taken substantially on the plane of line 4—4 of Figure 2, looking in the direction indicated by the arrows.

Referring more in detail to the drawing, it is to be noted that the pail 11 is of conventional form and has a solid bottom 12 with an upstanding annular flange 13 secured around the lower edge of the body of the pail while the upper edge 14 of the pail body may be rolled back to form an outer annular bead. The pail may be provided with a bail handle 15 having its opposite ends secured on upstanding lugs 16 carried on the outer face of the pail body adjacent the upper edge thereof and at diametrically opposite points, a conventional hand grip 17 being provided on the bail handle 15. Any other appropriate type of handle may be substituted if preferred.

A central opening 18 is provided in the pail bottom 12 and the threaded lower end of a tube 19 is extended downwardly through the opening 18 with nuts 20 and 21 threaded on said lower end of the tube 19 above and below the pail bottom 12. A packing ring 22 is also positioned around the threaded lower end of the tube 19, between the nut 20 and the pail bottom 12 to prevent leakage of the contents of the pail 11. A tap 23 is threaded on the lower extremity of the tube 19 to close the same immediately beneath the pail bottom 12. The tube 19 has a pair of openings 24 in its sides, above the nut 20 and an inverted concavo-convex strainer 25 is positioned centrally on the tube 19 with its circular edge resting on the upper face of the pail bottom 12. A reinforcing and finishing ring 26 is arranged at the circular edge of the strainer 25 and a second small ring 27 is arranged in the wall of the central opening of the strainer 25 for snug engagement around the tube 19. A coupling 28 is threaded on the upper end of the tube 19, above the centre of the strainer 25 and engaged over the out-turned annular flange 29 of a short pipe connection or section 30 of smaller diameter than the tube 19 and resting on the upper end of said tube 19 with a packing ring 31 interposed therebetween to prevent leakage at the upper end of said tube 19. Secured on the short pipe section 30 is the lower end of a flexible tube 32 which has its upper end extended through a float 33 resting on the surface of the milk or other fluid contents of the pail 11. A nipple 34 is carried on the upper extremity of the flexible tube 32, above the float 33.

The pail 11 may be readily positioned or removed from a supporting ring 35 and has a triangular stop member 36 secured on its outer face and adapted to rest on the upper edge of the supporting ring 35 to limit downward movement of the pail 11 in said supporting ring 35. The supporting ring 35 is removably mounted on an angular bracket 37 having a downwardly extended and inclined upper end 38 with the free lower extremity 39 thereof turned inwardly toward the upstanding portion of the angular bracket 37. This angular supporting bracket 37 is mounted on a supporting strip 40 which in turn is secured in upright position, by appropriate securing members, such as the screws 41, to an upright 42 or other permanent support. The inclined portion 38 of the angular bracket 37 is spaced slightly from the outer face of the supporting strip 40, thus making it possible to readily place the supporting ring 35 on the angular supporting bracket 37 and beneath the inturned extremity 39 of the said supporting bracket 37, or remove the supporting ring 35 completely from the angular supporting bracket 37. The supporting ring 35 has an outwardly offset portion 35a which readily fits under the inturned free extremity 39 of said angular supporting bracket 37 when the supporting ring 35 is in proper position on said angular supporting bracket 37. It will be apparent that the ring 35 and pail 11 will be firmly held by the angular supporting bracket 37 so as to prevent tilting of the supporting ring 35 and the pail 11. If desired, a block or other spacing member may be positioned on the upright or other permanent support 42 or a part of the supporting strip 40 turned outwardly toward the pail 11, below the angular supporting bracket 37 to further assure retention of the pail 11 in upright position and prevent the lower portion thereof from tilting toward the permanent support 42.

As the construction of the device has thus been described in detail, brief reference is now had to its use and modus operandi: The tube 19, strainer 25, flexible tube 30, float 33 and nipple 34, together with the tap 23 for the lower end of the tube 19 and the other parts mounted on said tube 19 may be readily assembled and secured in proper position within the pail 11. They may also be readily removed for cleansing and replaced without difficulty and without requiring special tools for such purposes. The pail 11 may be readily mounted on the supporting ring 35 after placing of the latter in position on the angular supporting bracket 37 mounted on an appropriate stationary support 42. The float 33 will readily seek the level of the milk or other liquid placed in the pail for feeding the baby animal and the nipple 34 will therefore be automatically supported in upright position above the liquid so that it may be readily reached by the baby animal. When the baby animal has learned to push aside the nipple 34 and the float 33 and reach down to the side of the float 33 to drink from the pail 11, this type of pail may be dispensed with and the baby animal then fed in the regular manner.

From the foregoing description taken in connection with the accompany drawing, it will be manifest that a pail and holder is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawing shall be interpreted as illustrative and not in a limited sense.

Having thus described my invention, what I claim as new and desire to secure by Letters Patent is:—

1. A calf feeder including the combination with a receptacle having a central opening in its bottom; of a rigid tube carried in said opening and provided with inlet openings in its sides while its lower end is closed; a strainer mounted over said tube within said receptacle; a flexible tube connected with the first mentioned tube; a float carried on said flexible tube; a nipple carried on the said flexible tube above said float; and means for holding said receptacle in upright position on a stationary support.

2. A calf feeder including the combination with a receptacle having an opening in the bottom thereof; of a rigid tube secured in said bottom opening; means for closing the lower end of said tube; said tube having side openings and an open upper end; a strainer mounted on said tube and having its lower end opening on the bottom of said receptacle while said strainer is snugly mounted on said tube above the side openings thereof; a flexible tube mounted on the upper end of said first mentioned tube; a float carried on said flexible tube; a nipple carried on said flexible tube above said float; and means for holding said receptacle in upright position on a stationary upright support.

3. A calf feeder including the combination with a receptacle; of a tube mounted in the bottom of said receptacle and having its lower end closed; said tube having side openings; a strainer mounted on said tube around the side openings thereof and resting on the bottom of the receptacle; a flexible tube carried on the first mentioned tube; a float carried on said flexible tube; a nipple carried on said flexible tube above said float; and means for holding said receptacle on a stationary support.

4. A calf feeder including the combination with a receptacle; of a flexible tube within said receptacle; a float carried on said flexible tube; a nipple projecting from the upper end of said flexible tube above said float; a rigid tube connected with said flexible tube and anchored to the bottom of said receptacle; said rigid tube having side openings therein; a straining member carried on said rigid tube and surrounding said side openings thereof; a supporting ring for said receptacle; means carried on said receptacle to limit downward movement of said receptacle in said ring; a supporting member for said ring; said ring having an offset portion for removable engagement on said supporting member; and means for attaching said supporting member to a stationary support.

In testimony whereof I hereunto affix my signature.

NIKOLAIS DAVID PITTSON. [L. S.]